(12) United States Patent
Song et al.

(10) Patent No.: US 12,547,873 B2
(45) Date of Patent: Feb. 10, 2026

(54) METHOD AND APPARATUS WITH NEURAL NETWORK INFERENCE OPTIMIZATION IMPLEMENTATION

(71) Applicant: Samsung Electronics Co., Ltd., Suwon-si (KR)

(72) Inventors: Uiseok Song, Suwon-si (KR); Sanggyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1258 days.

(21) Appl. No.: 17/244,006

(22) Filed: Apr. 29, 2021

(65) Prior Publication Data

US 2022/0083838 A1 Mar. 17, 2022

(30) Foreign Application Priority Data

Sep. 16, 2020 (KR) .......................... 10-2020-0118759

(51) Int. Cl.
*G06N 3/044* (2023.01)
*G06N 3/10* (2006.01)

(52) U.S. Cl.
CPC ............... *G06N 3/044* (2023.01); *G06N 3/10* (2013.01)

(58) Field of Classification Search
CPC .................................. G06N 3/044; G06N 3/10
See application file for complete search history.

(56) References Cited

U.S. PATENT DOCUMENTS

| 8,446,835 | B2 | 5/2013 | Baucke et al. |
| 8,584,124 | B2 | 11/2013 | Fee et al. |
| 2007/0094168 | A1* | 4/2007 | Ayala ............ G06N 3/105 706/15 |
| 2016/0337481 | A1 | 11/2016 | Smedberg et al. |
| 2019/0122107 | A1* | 4/2019 | Young ............ G06N 3/063 |
| 2020/0050971 | A1 | 2/2020 | Kim et al. |
| 2020/0125926 | A1 | 4/2020 | Choudhury et al. |

FOREIGN PATENT DOCUMENTS

| CN | 111191777 A | 5/2020 |
| JP | 6635265 B2 | 1/2020 |
| KR | 10-2046113 B1 | 11/2019 |

OTHER PUBLICATIONS

Zhang, Jie. "Batch-to-batch optimal control of a batch polymerisation process based on stacked neural network models." Chemical Engineering Science 63.5 (2008): 1273-1281. (Year: 2008).*

(Continued)

*Primary Examiner* — Kevin W Figueroa
(74) *Attorney, Agent, or Firm* — NSIP Law

(57) ABSTRACT

A method includes predicting, for sets of input data, an input data number of a subsequent interval of a first interval using an input data number of the first interval and an input data number of a previous interval of the first interval set in a neural network inference optimization, determining the predicted input data number to be a batch size of the subsequent interval, determining whether pipelining is to be performed in a target device based on a resource state of the target device, and applying, to the target device, an inference policy including the determined batch size and a result of the determining of whether the pipelining is to be performed.

20 Claims, 10 Drawing Sheets

(56) References Cited

OTHER PUBLICATIONS

Balles, Lukas, Javier Romero, and Philipp Hennig. "Coupling adaptive batch sizes with learning rates." arXiv preprint arXiv:1612.05086 (2016). (Year: 2016).*

Huang, Yanping, et al. "Gpipe: Efficient training of giant neural networks using pipeline parallelism." Advances in neural information processing systems 32 (2019). (Year: 2019).*

Das, Tathagata, et al. "Adaptive stream processing using dynamic batch sizing." Proceedings of the ACM Symposium on Cloud Computing. 2014. (Year: 2014).*

Song, Jin, et al. "Compiling optimization for neural network accelerators." Advanced Parallel Processing Technologies: 13th International Symposium, APPT 2019, Tianjin, China, Aug. 15-16, 2019, Proceedings 13. Springer International Publishing, 2019. (Year: 2019).*

B. Narayanan, Deepak, et al. "PipeDream: Generalized pipeline parallelism for DNN training." Proceedings of the 27th ACM symposium on operating systems principles. 2019. (Year: 2019).*

C. Yang, Bowen, et al. "Pipemare: Asynchronous pipeline parallel dnn training." arXiv preprint arXiv:1910.05124 (2019). (Year: 2019).*

Andersch, Michael. "Inference: The Next Step in GPU-Accelerated Deep Learning." *Parallel Forall, NVIDIA®* (2015) (6 pages in English).

Kellen Sunderland. "Parallel Inference in MXNet" *Apache Software Foundation* Jul. 2018 (2 pages in English).

\* cited by examiner

METHOD AND APPARATUS WITH NEURAL NETWORK INFERENCE OPTIMIZATION IMPLEMENTATION

CROSS-REFERENCE TO RELATED APPLICATIONS

This application claims the benefit under 35 USC § 119(a) of Korean Patent Application No. 10-2020-0118759 filed on Sep. 16, 2020, in the Korean Intellectual Property Office, the entire disclosure of which is incorporated herein by reference for all purposes.

BACKGROUND

1. Field

The following description relates to a method and apparatus with neural network inference optimization implementation.

2. Description of Related Art

Batch processing, a technique that collects various sets of input data and processes them in a batch in a deep neural network (DNN) model, is widely used to increase resource utilization.

Through batch processing, a batch may be processed in an accelerator. The accelerator may have limited resources, and thus the size of a batch may be a factor that affects an execution code generated by compiling a DNN model. Thus, an appropriate size of a batch may enable the accelerator to perform inference with an optimized execution code.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method includes predicting, for sets of input data, an input data number of a subsequent interval of a first interval using an input data number of the first interval and an input data number of a previous interval of the first interval set in a neural network inference optimization, determining the predicted input data number to be a batch size of the subsequent interval, determining whether pipelining is to be performed in a target device based on a resource state of the target device, and applying, to the target device, an inference policy including the determined batch size and a result of the determining of whether the pipelining is to be performed.

In an example in which a sum of an input time of data after execution of a timer and an inference latency is greater than a time limit, the method may further include determining, to be the input data number of the first interval, a number of sets of data present between a start time of the execution of the timer and the input time.

The method may further include generating a batch including the sets of data and transmitting the batch to the target device.

The predicting may include calculating a moving average of the input data number of the first interval and the input data number of the previous interval, and predicting the moving average as the input data number of the subsequent interval.

The predicting may include predicting the input data number of the subsequent interval from the input data number of the first interval and the input data number of the previous interval using a neural network-based prediction model.

The neural network-based prediction model may include a recurrent neural network (RNN) or a long short-term memory (LSTM).

The applying may include performing compiling on a neural network model based on the inference policy, and loading a result of the compiling onto the target device.

In an example in which the determined batch size is different from a preset batch size, the method may further include changing the preset batch size to the determined batch size such that a batch is generated in the subsequent interval based on the determined batch size.

The method may further include performing an initial setup based on an inference mode, and generating an initial execution code by compiling the neural network model based on the initial setup and loading the generated initial execution code onto the target device.

The initial setup may include an initial batch size and the result of the determining indicating that the pipelining is not performed.

The inference mode may be any one of a first mode in which a batch size is a first value, a second mode in which the batch size is a second value, a third mode that iterates an operation of the neural network model for processing a batch of a preset size, or a fourth mode that determines the inference policy.

A non-transitory computer-readable storage medium may store instructions that, when executed by one or more processors, configure the one or more processors to perform the method above.

In another general aspect, a computing device includes one or more processors. The one or more processors may predict an input data number of a subsequent interval of a first interval using an input data number of the first interval and an input data number of a previous interval of the first interval, determine the predicted input data number to be a batch size of the subsequent interval, determine whether pipelining is to be performed in a target device based on a resource state of the target device, and apply, to the target device, an inference policy including the determined batch size and a result of the determining of whether the pipelining is to be performed.

In an example in which a sum of an input time of data after execution of a timer and an inference latency is greater than a time limit, the one or more processors may record, as the input data number of the first interval, the number of sets of data present between a start time of the execution of the timer and the input time.

The one or more processors may generate a batch including the sets of data and transmit the generated batch to the target device.

The one or more processors may calculate a moving average of the input data number of the first interval and the input data number of the previous interval, and predict the moving average as the input data number of the subsequent interval.

The one or more processors may predict the input data number of the subsequent interval from the input data number of the first interval and the input data number of the one previous interval using a neural network-based prediction model.

The one or more processors may perform compiling on a neural network model based on the inference policy and loading a result of the compiling onto the target device.

In an example in which the determined batch size is different from a preset batch size, the one or more processors may change the preset batch size to the determined batch size such that a batch is generated in the subsequent interval based on the determined batch size.

The one or more processors may perform an initial setup based on an inference mode, generate an initial execution code by compiling the neural network model based on the initial setup, and load the generated initial execution code onto the target device.

The inference mode may be any one of a first mode in which a batch size is a first value, a second mode in which the batch size is a second value, a third mode configured to iterate an operation of the neural network model for processing a batch of a preset size, and a fourth mode configured to determine the inference policy.

Other features and aspects will be apparent from the following detailed description, the drawings, and the claims.

Figure 1:
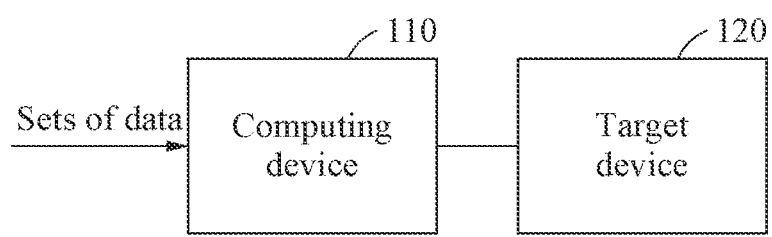
FIG. 1 illustrates an example of a computing device and an example of a target device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 illustrates an example of a computing device and an example of a target device.

In FIG. 1, a computing device 110 may receive sets of data. The received sets of data may be inference requests transmitted from one or more user terminals. The sets of data may include, for example, audio data and image data, but examples are not limited thereto.

The computing device 110 may collect the sets of data according to a batch size and transmit sets of data corresponding to a set batch size to a target device 120. That is, the computing device 110 may transmit a batch to the target device 120. The target device 120 may be an accelerator and include, for example, a neural processing unit (NPU), but examples of which are not limited thereto. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The computing device 110 may determine an optimal inference policy based on a real-time situation during runtime in an inference process (or inference service). Although to be described hereinafter, the computing device 110 may predict a distribution of sets of input data in a subsequent interval (for example, predict the number of sets of input data in the subsequent interval) and determine the inference policy based on a result of the predicting and a real-time resource state of the target device 120. The number of sets of input data may also be simply referred to herein as an input data number. The inference policy may include a batch size in the subsequent interval (or a subsequent batch size hereinafter), and information indicating whether pipelining is to be performed in the target device 120.

The computing device 110 may apply the determined inference policy to the target device 120. For example, in a case in which the determined inference policy is different from a predetermined inference policy, for example, the subsequent batch size is different from a preset batch size, the computing device 110 may compile or re-compile a neural network model based on the determined inference policy, and load an execution code generated by the compiling onto the target device 120. That is, the computing device 110 may transmit, to the target device 120, an execution code that is optimized according to a real-time situation. Thus, the target device 120 may execute inference with the execution code optimized for the real-time situation. A detailed description will follow.

FIGS. 2 through 6 illustrate an example of an optimization operation for neural network inference to be performed by a computing device.

The computing device 110 may perform operations 210 through 290 to be described hereinafter with reference to FIG. 2. In FIG. 3, the computing device 110 may include a batch generator 310, a buffer 320, an input counter 330, a timer 340, a statistics manager 350, an input number predictor 360, a policy determiner 370, a compiler 380, and a loader 390. The batch generator 310, the input counter 330, the timer 340, the statistics manager 350, the input number predictor 360, the policy determiner 370, the compiler 380, and the loader 390 may be embodied by one or more processors.

Figure 2:
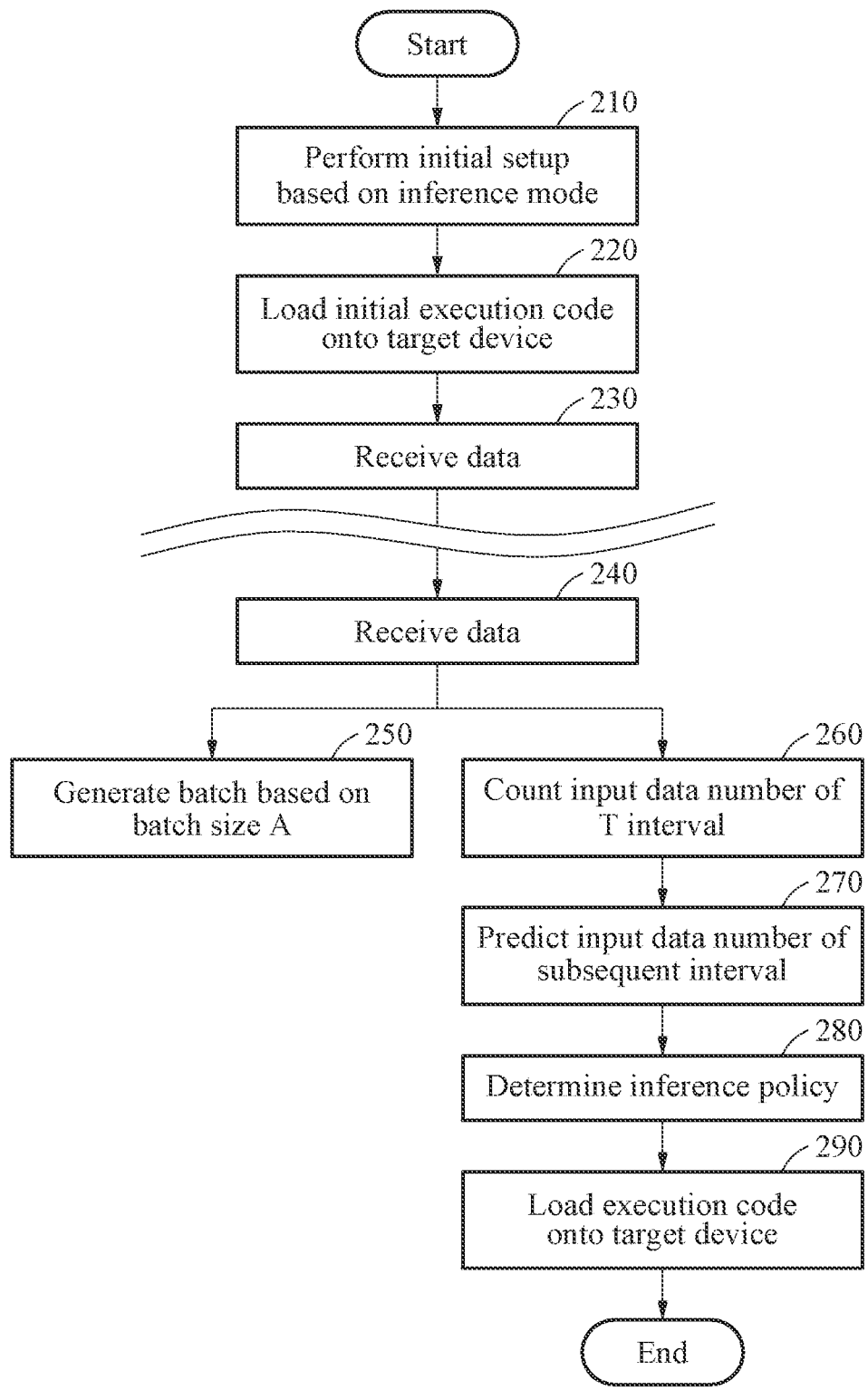
FIGS. 2 through 6 illustrate an example of an optimization operation for neural network inference to be performed by a computing device.
Figure 3:
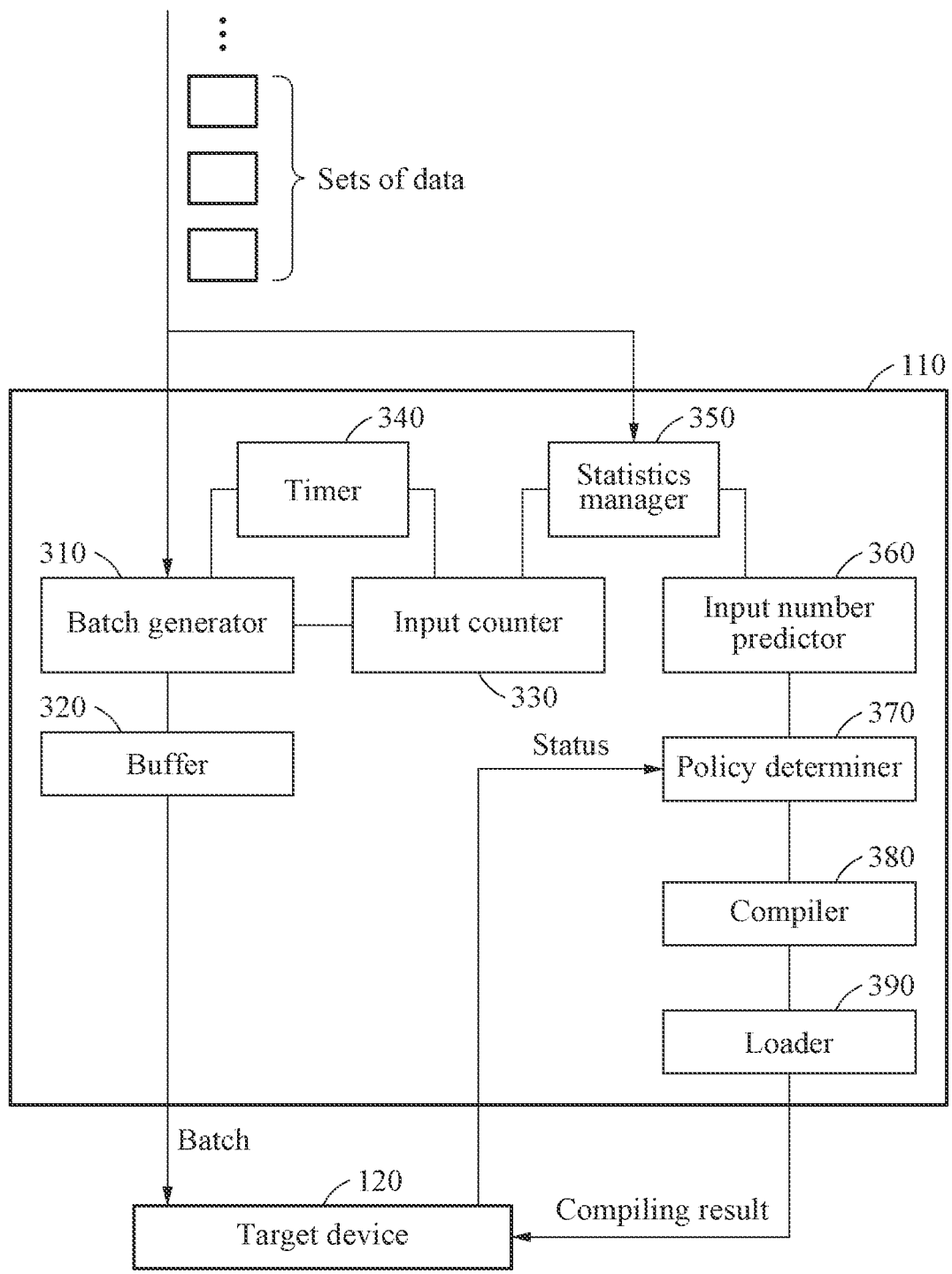

In FIG. 2, in operation 210, the computing device 110 performs an initial setup based on an inference mode. In operation 220, the computing device 110 loads an initial execution code onto the target device 120. Table 1 indicates examples of the inference mode.

TABLE 1

| Inference mode | Description |
| --- | --- |
| Latency mode (or first mode) | A mode in which a batch size is a first value |
| Throughput mode (or second mode) | A mode in which a batch size is a second value |
| Iteration mode (or third mode) | A mode that iterates an operation of a neural network model for processing a batch of size 1 |
| Dynamic mode (or fourth mode) | A mode that optimizes or determines an inference policy and compiles or re-compiles a neural network model based on the optimized inference policy |

In Table 1 above, in the latency mode or the first mode, the batch size is set as the first value, for example, 1. The batch size is set as 1 in the latency mode, and thus a latency that may be experienced by a user requesting inference may be minimized.

When the inference mode is set as the latency mode, the compiler 380 may generate the initial execution code by compiling a neural network model based on "pipelining off," an initial batch size (e.g., 1), and hardware information of the target device 120. The loader 390 may then load the generated initial execution code onto a memory of the target device 120. Here, "pipelining off" indicates that the pipelining is not performed in the target device 120. In contrast, "pipelining on" indicates that the pipelining is performed in the target device 120.

In the throughput mode or the second mode, the batch size is set as the second value, for example, N. Here, N is an integer greater than or equal to 2, and may be determined by an inference service provider or be a maximum batch size considering the memory of the target device 120.

When the inference mode is set as the throughput mode, the compiler 380 may generate the initial execution code by compiling the neural network model based on "pipelining off," an initial batch size (e.g., N), and the hardware information of the target device 120. The loader 390 may then load the generated initial execution code onto the memory of the target device 120.

The iteration mode or the third mode may be a mode that iterates an operation of the neural network model to process a batch of the size of 1. For example, when a batch of the size of M is input to the target device 120, the neural network model for processing the batch of the size of 1 may be iteratively performed M times in the iteration mode.

When the inference mode is set as the iteration mode, the compiler 380 may generate the initial execution code by compiling the neural network model based on "pipelining off," an initial batch size (e.g., 1), and the hardware information of the target device 120. The loader 390 may then load the generated initial execution code onto the memory of the target device 120.

In the dynamic mode or the fourth mode, the inference policy may be optimized or determined. When the dynamic mode is set, an appropriate batch size may be determined. A detailed description of the determining of a batch size will follow.

When the inference mode is set as the dynamic mode, the compiler 380 may generate the initial execution code by compiling the neural network model based on "pipelining off," an initial batch size (e.g., 1), and the hardware information of the target device 120. The loader 390 may then load the generated initial execution code onto the memory of the target device 120. In the dynamic mode, as an inference process progresses, the inference policy may be optimized or determined in accordance with a real-time situation.

In an example, the computing device 110 may receive and store a time limit. The time limit may be set by an inference service provider. The time limit indicates a maximum time from a time at which an inference request is made by a user to a time at which a response to the inference request is received.

Hereinafter, an example in which the inference mode is set as the dynamic mode will be described in detail.

In operation 230, after loading the initial execution code onto the target device 120, the computing device 110 receives sets of data from one or more user terminals.

The computing device 110 may generate a batch based on an initial batch size and transmit the generated batch to the target device 120. The computing device 110 may predict an input data number of a subsequent interval, and determine an inference policy using a real-time resource state of the target device 120 and the predicted input data number. The compiler 380 may compile a neural network model based on the determined inference policy, and thus generate an execution code optimized for a real-time situation. The target device 120 may receive the execution code from the computing device 110 and execute inference on sets of input data in the subsequent interval using the execution code.

In operation 240, as time passes, the computing device 110 receives data from one or more user terminals. Here, it is assumed that the batch size is set as A, and a current interval is a T interval.

In operation 250, the computing device 110 generates a batch based on the batch size A. For example, the batch generator 310 may store, in the buffer 320, the sets of data input to the computing device 110. In an example in which the size of the sets of data stored in the buffer 320 reaches the batch size A, or when the time limit is reached after the timer 340 is executed, the batch generator 310 may transmit the sets of data stored in the buffer 320 to the target device 120. A detailed description of operation 250 will follow with reference to FIGS. 4 through 5B.

In operation 260, the computing device 110 counts an input data number of the T interval. For example, the input counter 330 may update an input count each time data is input to the computing device 120 after the execution of the timer 340. In an example in which a sum of an input time of data after the execution of the timer 340 and an inference latency is greater than the time limit, the input counter 330 may determine, to be the input data number of the T interval, the number of sets of data present between the input time of the data and a time after the execution of the timer 340. A detailed description of operation 260 will follow with reference to FIG. 6.

In operation 270, the computing device 110 predicts an input data number of a subsequent interval of the T interval based on the input data number of the T interval and an input data number of at least one previous interval of the T interval. That is, the computing device 110 may predict an input distribution in the subsequent interval.

In an example, the input number predictor 360 may calculate a moving average of the input data number of the T interval and the input data number of the previous interval of the T interval, and predict the moving average obtained through the calculating as the input data number of the subsequent interval of the T interval. Here, a previous interval indicates a time interval prior to a current time interval, and a subsequent interval indicates a time interval subsequent to the current time interval. In some cases, the input number predictor 260 may predict the input data number of the subsequent interval of the T interval using a statistical model, such as, for example, an autoregressive integrated moving average (ARIMA).

In another example, the input number predictor 360 may include a neural network-based prediction model. The neural network-based prediction model may predict the input data number of the subsequent interval from the input data number of the T interval and the input data number of the previous interval. The neural network-based prediction model may include, for example, a recurrent neural network (RNN) or a long short-term memory (LSTM). In an example, there may be a separate accelerator for an operation of the neural network-based prediction model.

In operation 280, the computing device 110 determines an inference policy based on the predicted input data number of the subsequent interval and a resource state of the target device 120. The determined inference policy may include a subsequent batch size and information indicating whether pipelining is to be performed in the target device 120.

For example, the policy determiner 370 may determine the predicted input data number of the subsequent interval to be the subsequent batch size. In this example, in an example in which the determined subsequent batch size is different from the batch size A, the policy determiner 370 may change the batch size A to the subsequent batch size. In addition, the policy determiner 370 may determine whether the pipelining is to be performed in the target device 120 based on the resource state of the target device 120. In an example in which spare resources of the target device 120 are sufficient to perform the pipelining, the policy determiner 370 may determine the pipelining to be performed (e.g., "pipelining on"). In an example in which the spare resources of the target device 120 are not sufficient to perform the pipelining, the policy determiner 370 may determine the pipelining not to be performed (e.g., "pipelining off"). For example, in an example in which a scratchpad memory corresponding to the size of the neural network model is available for the target device 120 to use and the number of available cores of the target device 120 is greater than the number of stages, the target device 120 may gain an advantage by performing the pipelining. In this example, the stages may be obtained by dividing the neural network model. In such an example in which the scratchpad memory corresponding to the size of the neural network model is available for the target device 120 to use and the number of the available cores of the target device 120 is greater than the number of the stages, the policy determiner 370 may determine "pipelining on."

In operation 290, when the determined inference policy is different from a predetermined inference policy, the computing device 110 loads, onto the target device 120, an execution code to which the determined inference policy is applied. For example, in an example in which the subsequent batch size is different from the preset batch size A, the compiler 380 may generate an execution code by performing compiling on the neural network model based on the determined inference policy. According to implementation, in an example in which, although the subsequent batch size is the same as the preset batch size A, the determined inference policy includes "pipelining on" while the predetermined inference policy includes "pipelining off," or the determined inference policy includes "pipelining off" while the predetermined inference policy includes "pipelining on," the compiler 380 may perform the compiling on the neural network model based on the determined inference policy. The loader 390 may then load the generated execution code onto a memory of the target device 120.

Thus, the target device 120 may perform inference with a more optimized execution code on sets of input data in a subsequent interval, and it is thus possible to improve resource utilization.

Hereinafter, operation 250 of generating a batch will be described in detail with reference to FIGS. 4 through 5B.

Figure 4:
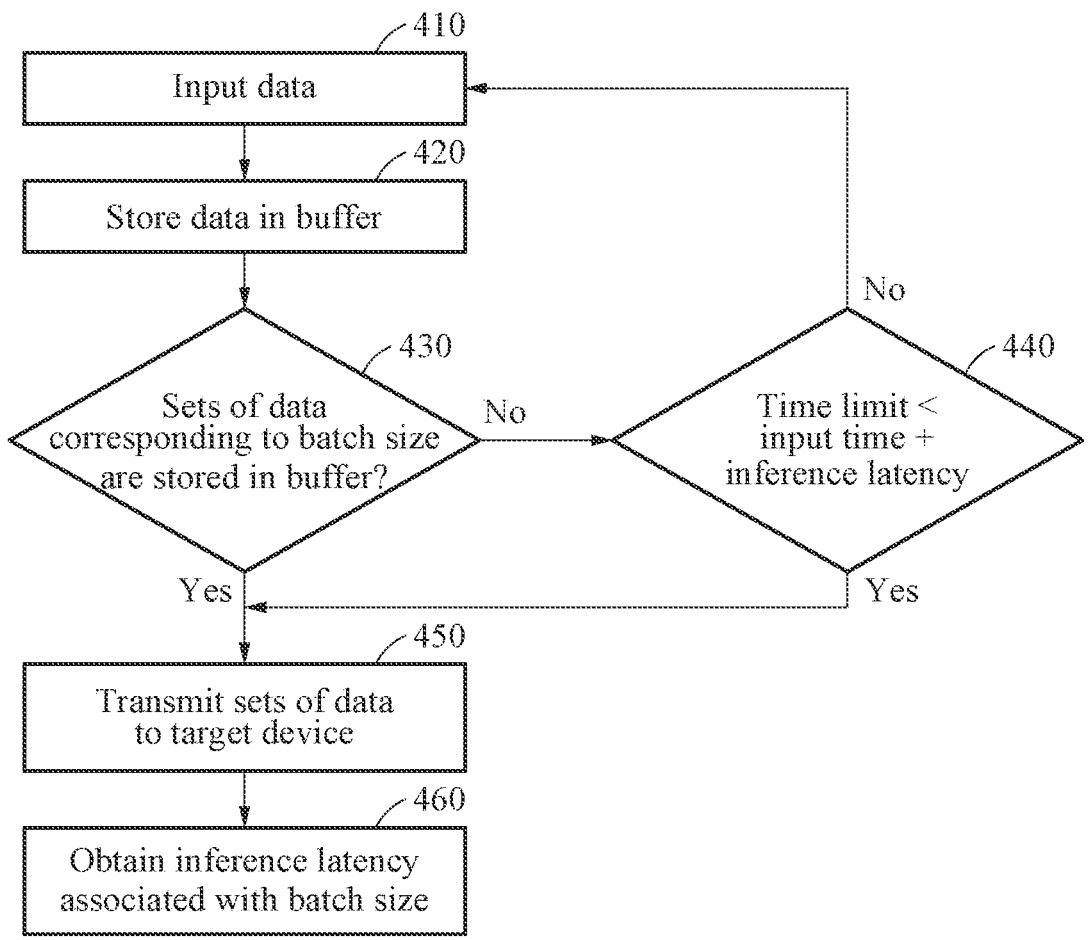

In FIG. 4, in operation 420, when data is input to the computing device 110 in operation 410, the batch generator 310 stores the data in the buffer 320. The statistics manager 250 may store input time information of the data, which is information associated with a time at which the data is input. For example, the statistics manager 250 may store the input time information of the data in a database using the timer 240.

In operation 430, the batch generator 310 verifies whether sets of data corresponding to a batch size A are stored in the buffer 320. In other words, the batch generator 310 may determine whether the size of the sets of data stored in the buffer 320 reaches the batch size A.

In operation 450, when the sets of data corresponding to the batch size A are stored in the buffer 320, the batch generator 310 transmits the sets of data of the batch size A to the target device 120. In operation 440, when the sets of data corresponding to the batch size A are not stored in the buffer 320, the batch generator 310 compares a sum of the input time of the data and an inference latency $L_a$ to a time limit. A detailed description of the inference latency $L_a$ will follow with reference to FIG. 7. Here, when the sum of the input time of the data and the inference latency $L_a$ is greater than the time limit, the batch generator 310 transmits sets of data that are within (or not beyond) the time limit to the target device 120 in operation 450.

The target device 120 may then perform inference on the sets of data received from the computing device 110 and transmit a result of the inference to the computing device 110.

In operation 460, the batch generator 310 obtains or calculates an inference latency $L_T$ associated with the batch size A. For example, in an example in which the computing device 110 transmits sets of data for inference to the target device 120 at a time $t_a$ and receives a result of the inference from the target device 120 at a time $t_b$, the batch generator 310 may determine the inference latency $L_T$ associated with the batch size A to be a difference between $t_b$ and $t_a$ (that is, $t_b-t_a$).

Figure 5A:
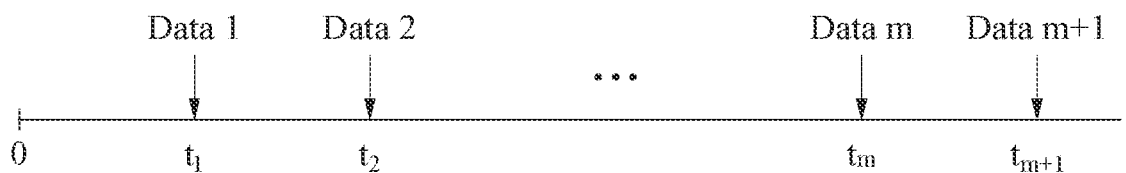
Figure 5B:
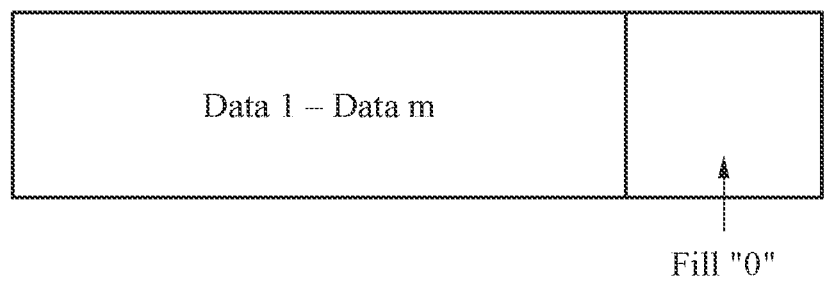

A detailed example of the batch generation described above with reference to FIG. 4 is illustrated in FIG. 5A.

In FIG. 5A, when the computing device 110 receives data 1, the batch generator 310 may store received data 1 in the buffer 320.

The batch generator 310 may compare the size of data 1 stored in the buffer 320 to a batch size A. In an example in which the size of data 1 stored in the buffer 320 is less than the batch size A, the batch generator 310 may compare a sum of an input time of data 1 and an inference latency $L_a$ to a time limit. In the example of FIG. 5A, data 1 is input to the computing device 110 at a time $t_1$ after the timer 340 is executed, and thus the batch generator 310 may verify the input time of data 1 to be the time $t_1$. Here, the sum of the input time $t_1$ of data 1 and the inference latency $L_a$ may be less than the time limit.

The computing device 110 receives data 2, and the batch generator 310 may store received data 2 in the buffer 320.

The batch generator 310 may compare the size of data 1 and data 2 stored in the buffer 320 to the batch size A. When the size of data 1 and data 2 is less than the batch size A, the batch generator 310 may compare a sum of an input time $t_2$ of data 2 and the inference latency $L_a$ to the time limit. Here, the sum of the input time $t_2$ of data 2 and the inference latency $L_a$ may be less than the time limit.

As time passes, the computing device 110 receives data m, before which data 1 through data m−1 may be stored in the buffer 320. The batch generator 310 may store received data m in the buffer 320, and compare the size of data 1 through data m stored in the buffer 320 to the batch size A. When the size of data 1 through data m is less than the batch size A, the batch generator 310 may compare a sum of an input time $t_m$ of data m and the inference latency $L_a$ to the time limit. Here, the sum of the input time $t_m$ of data m and the inference latency $L_a$ may be less than the time limit.

The computing device 110 receives data m+1, and the batch generator 310 may store received data m+1 in the buffer 320. The batch generator 310 may compare the size of data 1 through data m+1 stored in the buffer 320 to the batch size A.

When the size of data 1 through data m+1 stored in the buffer 320 is less than the batch size A, the batch generator 310 may compare a sum of an input time $t_{m+1}$ of data m+1 and the inference latency $L_a$ to the time limit. Here, when the sum of the input time $t_{m+1}$ of data m+1 and the inference latency $L_a$ is greater than the time limit, the batch generator 310 may generate a batch including data 1 through data m that are within (or not beyond) the time limit. For example, as illustrated in FIG. 5B, the batch generator 310 may generate a batch 510 including data 1 through data m. In the batch 510, there may be an empty spot corresponding to a difference between the batch size A and the size of data 1 through data m. The batch generator 310 may fill the batch 510 with preset values (e.g., 0). That is, when the size of data 1 through data m is B, the batch generator 310 may fill the batch 510 with 0 by the difference between A and B. The batch generator 310 may transmit the batch 510 to the target device 120.

The target device 120 may then perform inference on data 1 through data m received from the computing device 110, and transmit a result of the inference to the computing device 110.

Dissimilar to the example described above with reference to FIGS. 5A and 5B, when the size of data 1 through data m+1 stored in the buffer 320 corresponds to the batch size A, the batch generator 310 may generate a batch with data 1 through data m+1 and transmit the generated batch to the target device 120. In such an example, the target device 120 may perform inference on data 1 through data m+1 received from the computing device 110 and transmit a result of the inference to the computing device 110.

Figure 6:
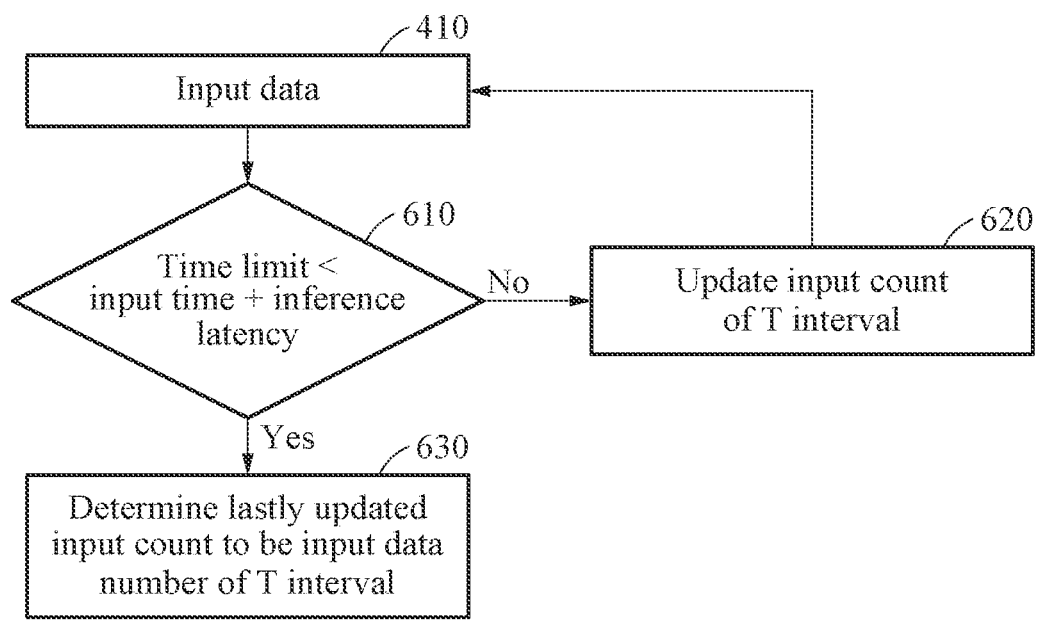

FIG. 6 illustrates a flowchart of an example of counting an input data number of a T interval.

In FIG. 6, in operation 610, when data is input to the computing device 110 in operation 410, the input counter 330 compares a sum of an input time of the data and an inference latency $L_a$ to a time limit. In operation 620, when the sum of the input time of the data and the inference latency $L_a$ is less than or equal to the time limit, the input counter 330 updates an input count of the T interval. In operation 630, when the sum of the input time of the data and the inference latency $L_a$ is greater than the time limit, the input counter 330 determines a lastly (or most recently)

updated input count to be an input data number of the T interval. The statistics manager 350 may then record the input data number of the T interval in a database.

In the foregoing example of FIG. 5A, when data 1 is input to the computing device 110, the input counter 330 may compare the sum of the input time $t_1$ of data 1 and the inference latency $L_a$ to the time limit. In this example, it is assumed that an input count of the T interval when data 1 is input is 0. Then, the sum of the input time $t_1$ of data 1 and the inference latency $L_a$ is less than the time limit, and thus the input counter 330 may update the input count of the T interval from 0 to 1. When data 2 is input to the computing device 110, the input counter 330 may compare the sum of the input time $t_2$ of data 2 and the inference latency $L_a$ to the time limit. The sum of the input time $t_2$ of data 2 and the inference latency $L_a$ is less than the time limit, and thus the input counter 330 may update the input count of the T interval from 1 to 2.

As time passes, data m is input to the computing device 110. The input counter 330 may compare the sum of the input time $t_m$ of data m and the inference latency $L_a$ to the time limit. The sum of the input time $t_m$ of data m and the inference latency $L_a$ is less than the time limit, and thus the input counter 330 may update the input count of the T interval to m.

When data m+1 is input to the computing device 110, the input counter 330 may compare the sum of the input time $t_{m+1}$ of data m+1 and the inference latency $L_a$ to the time limit. The sum of the input time $t_{m+1}$ of data m+1 and the inference latency $L_a$ is greater than the time limit, and thus the input counter 330 may determine a lastly updated input count m to be the input data number of the T interval. That is, the sum of the input time $t_{m+1}$ of data m+1 and the inference latency $L_a$ is greater than the time limit, and thus the input counter 330 may determine, to be the input data number of the T interval, the number m of sets of data between the time after the execution of the timer 340 and the input time $t_{m+1}$ of data m+1.

The statistics manager 350 may record the input data number m of the T interval in the database. In the database, an input data number of each of the previous intervals prior to the T interval may be recorded.

The statistics manager 350 may transmit, to the input number predictor 360, the input data number of the T interval and an input data number of at least one previous interval of the T interval. As described above, the input number predictor 360 may predict an input data number of a subsequent interval of the T interval based on the input data number of the T interval and the input data number of the at least one previous interval of the T interval.

Figure 7:
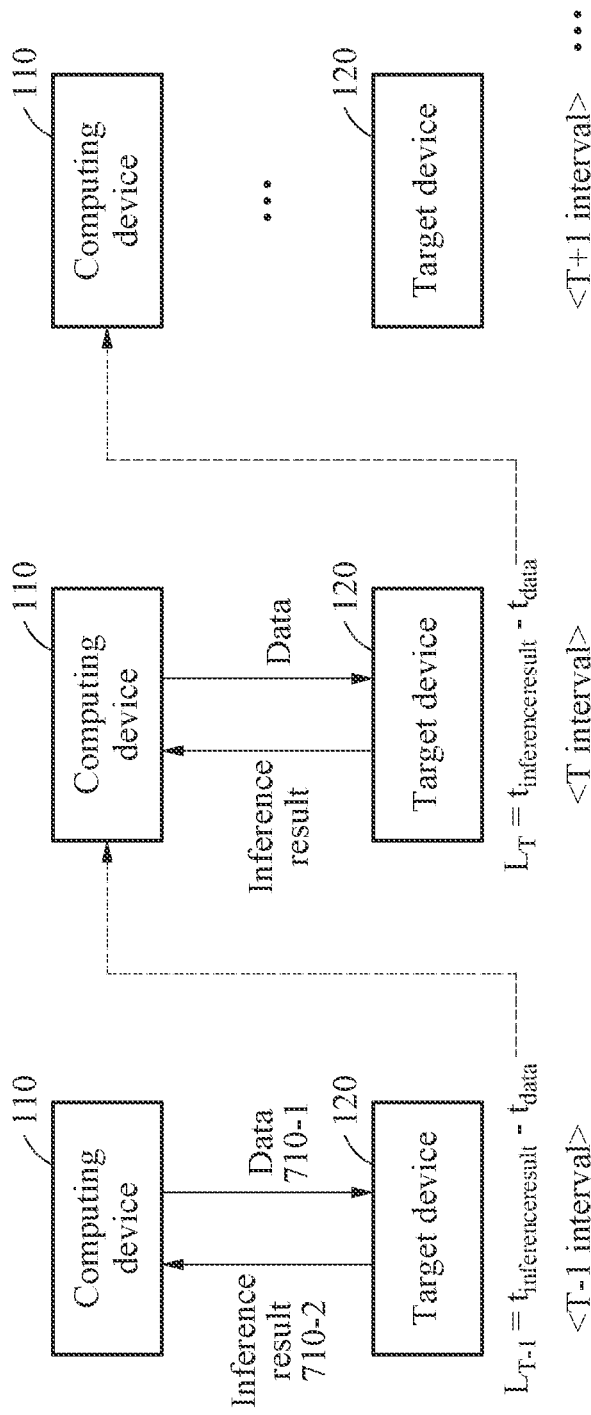
FIG. 7 illustrates an example of an inference latency.

FIG. 7 illustrates an example of an inference latency.

In FIG. 7, the computing device 110 may transmit sets of data 710-1 to the target device 120. In the example of FIG. 7, a batch size is B. The target device 120 may execute inference on the sets of data 710-1 and transmit an inference result 710-2 to the computing device 110.

The computing device 110 (or the batch generator 310) may determine, to be an inference latency $L_{T-1}$ associated with the batch size B, a difference between a timeq $t_{inference\ result\ 710\text{-}2}$ at which the inference result 710-2 is received and a time $t_{data\ 710\text{-}1}$ at which the sets of data 710-1 is transmitted. That is, the inference latency $L_{T-1}$ may be a value obtained by $t_{inference\ result\ 710\text{-}2} - t_{data\ 710\text{-}1}$ (that is, $L_{T-1} = t_{inferenceresult\ 710\text{-}2} - t_{data\ 710\text{-}1}$).

The inference latency $L_{T-1}$ may correspond to the inference latency $L_a$ described above. However, this is provided merely as an example, and the inference latency $L_a$ may be an average of inference latencies in previous intervals of a T interval.

An inference latency $L_T$ associated with a batch size A, which is described above with reference to operation 460 in FIG. 4, may be used for the batch generator 310 to generate a batch in a subsequent interval, and used for the input counter 330 to count an input data number.

Figure 8:
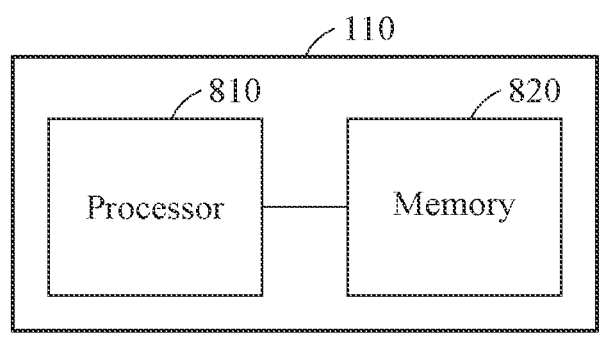
FIG. 8 illustrates an example of a computing device.

FIG. 8 illustrates an example of a computing device.

In FIG. 8, the computing device 110 may include a processor 810 and a memory 820.

The memory 820 may store a neural network model.

The processor 810 may predict an input data number of a subsequent interval of a first interval (e.g., T interval described above) using an input data number of the first interval and an input data number of at least one previous interval of the first interval. For example, in an example in which a sum of an input time of data after execution of the timer 340 and an inference latency is greater than a time limit, the processor 810 may determine, to be the input data number of the first interval, the number of sets of data (e.g., first through m sets of data described above) between a time after the execution of the timer 340 and the input time of the data (e.g., data m+1 described above). The processor 810 may then generate a batch including the sets of data (e.g., first through m sets of data described above) and transmit the generated batch to the target device 120.

The processor 810 may determine the predicted input data number to be a batch size of the subsequent interval, and determine whether pipelining is to be performed in the target device 120 based on a resource state of the target device 120.

The processor 810 may apply, to the target device 120, an inference policy including the determined batch size and information indicating whether the pipelining is to be performed in the target device 120.

For a more detailed description, reference may be made to what has been described above with reference to FIGS. 1 through 7, and thus a more detailed and repeated description will be omitted here for brevity.

Figure 9:
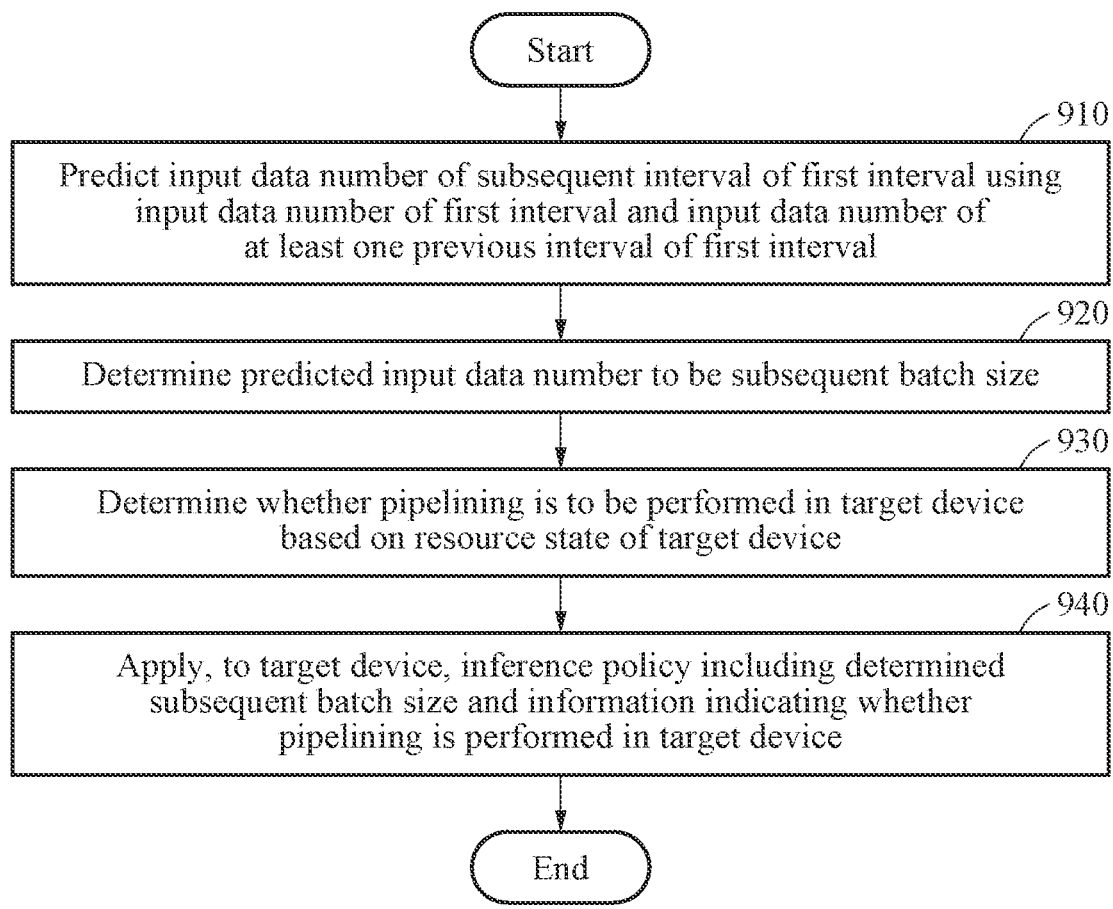
FIG. 9 illustrates a flowchart of an example of an operation method of a computing device.

FIG. 9 illustrates a flowchart of an example of an operation method of a computing device.

In FIG. 9, in operation 910, the computing device 110 predicts an input data number of a subsequent interval of a first interval using an input data number of the first interval and an input data number of at least one previous interval of the first interval.

In operation 920, the computing device 110 determines the predicted input data number to be a subsequent batch size. As described above, the subsequent batch size indicates a batch size in the subsequent interval. In operation 920, in an example in which the determined subsequent batch size is different from a preset batch size, the computing device 110 may change the preset batch size to the determined subsequent batch size. Thus, the computing device 110 may generate a batch of the subsequent interval based on the determined subsequent batch size.

In operation 930, the computing device 110 determines whether pipelining is to be performed in the target device 120 based on a resource state of the target device 120.

In operation 940, the computing device 110 applies, to the target device 120, an inference policy including the determined subsequent batch size and information indicating whether the pipelining is to be performed in the target device 120. In operation 940, the computing device 110 may compile a neural network model based on the inference policy and load a result of the compiling onto the target device 120.

For a more detailed description, reference may be made to what has been described above with reference to FIGS. 1 through 8, and thus a more detailed and repeated description will be omitted here for brevity.

Figure 10:
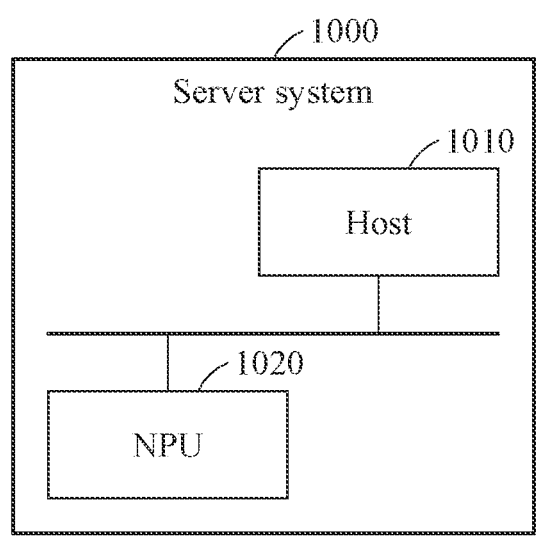
FIG. 10 illustrates an example of a server system.

FIG. 10 illustrates an example of a server system.

In FIG. 10, a server system 1000 may include a host 1010 and an NPU 1020.

The host 1010 and the NPU 1020 may communicate with each other through a bus.

The host 1010 may correspond to the computing device 110 described herein, and the NPU 1020 may correspond to the target device 120 described herein.

Although the server system 1000 is illustrated in FIG. 10 as including one NPU, this is merely an example, and the server system 1000 may include a plurality of NPUs.

For a more detailed description, reference may be made to what has been described above with reference to FIGS. 1 through 9, and thus a more detailed and repeated description will be omitted here for brevity.

In another example, the computing device 110 and the target device 120 may be included in a mobile terminal (e.g., smartphone, tablet, etc.).

The computing device, the target device, the server system, computing device 110, target device 120, batch generator 310, buffer 320, input counter 330, timer 340, statistics manager 350, input number predictor 360, policy determiner 370, compiler 380, loader 390, processor 810, memory 820, server system 1000, host 1010, NPR 1020, and other devices, apparatuses, units, modules, and components described herein with respect to FIGS. 1-10 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD- ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, comprising:
    performing compiling on at least portions of a neural network model based on a first inference policy of a first interval to generate a first execution code;
    transmitting the first execution code to a target device such that the target device performs inference with the first execution code;
    predicting, for sets of input data, an input data number of a subsequent interval of the first interval using an input data number of the first interval and an input data number of a previous interval of the first interval set in a neural network inference optimization for the neural network model;
    determining the predicted input data number to be a batch size of the subsequent interval;
    determining whether pipelining is to be performed in the target device based on a resource state of the target device;
    determining a second inference policy, of the subsequent interval, including the determined batch size and a result of the determining of whether the pipelining is to be performed;
    performing compiling on at least portions of the neural network model based on the second inference policy to generate a second execution code, in response to the second inference policy being different from the first inference policy; and
    transmitting the second execution code to the target device such that the target device performs inference with the second execution code.

2. The method of claim 1, further comprising:
    when a sum of an input time of data after execution of a timer and an inference latency is greater than a time limit, determining, to be the input data number of the first interval, a number of sets of data present between a start time of the execution of the timer and the input time.

3. The method of claim 2, further comprising:
    generating a batch including the sets of data and transmitting the generated batch to the target device.

4. The method of claim 1, wherein the predicting comprises:
    calculating a moving average of the input data number of the first interval and the input data number of the previous interval; and
    predicting the moving average as the input data number of the subsequent interval.

5. The method of claim 1, wherein the predicting comprises:
    predicting the input data number of the subsequent interval from the input data number of the first interval and the input data number of the previous interval using a neural network-based prediction model.

6. The method of claim 5, wherein the neural network-based prediction model includes a recurrent neural network (RNN) or a long short-term memory (LSTM).

7. The method of claim 1, further comprising:
    when the determined batch size is different from a preset batch size, changing the preset batch size to the determined batch size such that a batch is generated in the subsequent interval based on the determined batch size.

8. The method of claim 1, further comprising:
    performing an initial setup based on an inference mode; and
    generating an initial execution code by compiling a neural network model based on the initial setup and loading the generated initial execution code onto the target device.

9. The method of claim 8, wherein the initial setup includes an initial batch size and the result of the determining indicating that the pipelining is not performed.

10. The method of claim 8, wherein the inference mode is any one of:
    a first mode in which a batch size is a first value;
    a second mode in which the batch size is a second value;
    a third mode that iterates an operation of the neural network model for processing a batch of a preset size; or
    a fourth mode that determines the inference policy.

11. A non-transitory computer-readable storage medium storing instructions that, when executed by one or more processors, configure the one or more processors to perform the method of claim 1.

12. A computing device, comprising:
    one or more processors, set in a neural network inference optimization for a neural network model, are configured to:
        perform compiling on at least portions of the neural network model based on a first inference policy of a first interval to generate a first execution code;
        transmit the first execution code to a target device such that the target device performs inference with the first execution code;

predict an input data number of a subsequent interval of a first interval using an input data number of the first interval and an input data number of a previous interval of the first interval for sets of input data;

determine the predicted input data number to be a batch size of the subsequent interval;

determine whether pipelining is to be performed in a target device based on a resource state of the target device;

determine a second inference policy, of the subsequent interval, including the determined batch size and a result of the determining of whether the pipelining is to be performed;

perform compiling on at least portions of the neural network model based on the second inference policy to generate a second execution code in response to the second inference policy being different from the first inference policy; and transmit the second execution code to the target device such that the target device perform inference with the second execution code.

13. The computing device of claim 12, wherein the one or more processors are further configured to:

when a sum of an input time of data after execution of a timer and an inference latency is greater than a time limit, record, as the input data number of the first interval, a number of sets of data present between a start time of the execution of the timer and the input time.

14. The computing device of claim 13, wherein the one or more processors are further configured to:

generate a batch including the sets of data and transmit the generated batch to the target device.

15. The computing device of claim 12, wherein the one or more processors are further configured to:

calculate a moving average of the input data number of the first interval and the input data number of the previous interval; and predict the moving average as the input data number of the subsequent interval.

16. The computing device of claim 12, wherein the one or more processors are further configured to:

predict the input data number of the subsequent interval from the input data number of the first interval and the input data number of the previous interval using a neural network-based prediction model.

17. The computing device of claim 12, wherein the one or more processors are further configured to:

when the determined batch size is different from a preset batch size, change the preset batch size to the determined batch size such that a batch is generated in the subsequent interval based on the determined batch size.

18. The computing device of claim 12, wherein the one or more processors are further configured to:

perform an initial setup based on an inference mode;

generate an initial execution code by compiling a neural network model based on the initial setup; and load the generated initial execution code onto the target device.

19. The computing device of claim 12, wherein the inference mode is any one of:

a first mode in which a batch size is a first value;

a second mode in which the batch size is a second value;

a third mode configured to iterate an operation of a neural network model for processing a batch of a preset size; and a fourth mode configured to determine the inference policy.

20. The computing device of claim 12, further comprising a memory configured to store instructions;

wherein the one or more processors are configured to:

predict the input data number of the subsequent interval of the first interval using the input data number of the first interval and the input data number of the previous interval of the first interval for sets of input data;

determine the predicted input data number to be the batch size of the subsequent interval;

determine whether pipelining is to be performed in the target device based on the resource state of the target device; and apply, to the target device, the inference policy including the determined batch size and the result of the determining of whether the pipelining is to be performed.

* * * * *